March 29, 1960 W. L. STALDER 2,930,787
SOLIDS RECOVERY FROM A POLYMER SOLUTION
Filed Dec. 28, 1956
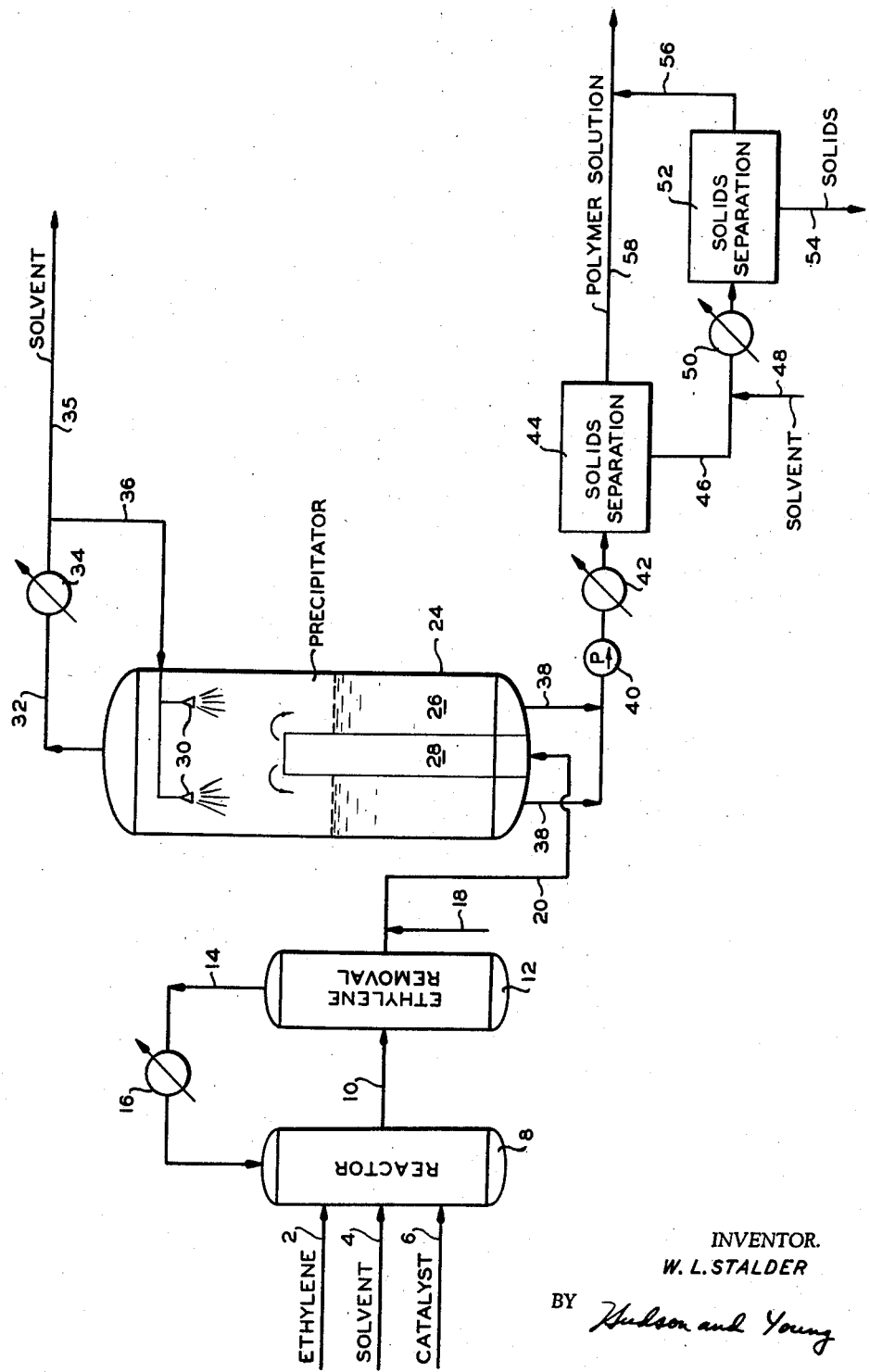
INVENTOR.
W. L. STALDER
BY *Hudson and Young*
ATTORNEYS

United States Patent Office 2,930,787
Patented Mar. 29, 1960

2,930,787

SOLIDS RECOVERY FROM A POLYMER SOLUTION

William L. Stalder, Bartlesville, Okla., assignor to Phillips Petroleum Company, a corporation of Delaware Application December 28, 1956, Serial No. 631,166

6 Claims. (Cl. 260—94.9)

This invention relates to the recovery of solids from a polymer solution. In one aspect it relates to the recovery of sub-divided catalyst solids from a solution of solid olefin polymer by agglomerating said solids with precipitated polymer.

In certain methods of preparing solid polymers, such as polymers of ethylene, the product is obtained as a solution of polymer in a solvent or diluent material and contains finely divided catalyst solids. Generally, it is desirable that the final polymer product be free of catalyst solids and it may be further desirable to recover the catalyst for re-use in the polymerization reaction. It has been found that recovery of the catalyst is facilitated by agglomerating the catalyst as described in the copending application of Hanson and Croley, Serial No. 572,310, filed March 19, 1956.

It is the object of this invention to provide an improved process for the recovery of solids from a polymer solution.

Another object of this invention is to provide an improved process for the recovery of catalyst solids from a polymer solution by agglomeration.

Still another object of this invention is to provide an improved process for the recovery of sub-divided catalysts solids by agglomeration from a solution of solid ethylene polymer.

These and other objects of the invention will become more readily apparent from the following detailed description and discussion.

The foregoing objects are achieved, broadly, by reducing the temperature of a solids-containing polymer solution whereby polymer precipitates from solution and the solids agglomerate; thereafter increasing the temperature of the solution whereby a portion of the precipated polymer contained in the agglomerated solids is redissolved and separating the agglomerated solids from the polymer solution.

In one aspect of the invention a small amount of solvent is added to the separated agglomerated solids, the mixture is heated whereby polymer associated with the agglomerated solids is dissolved and the solids are separated from the dissolved polymer. The dissolved polymer can be combined with the polymer solution from the first solids separation step or recovered as a separate product.

This invention is applicable in general to the treatment of olefin polymers such as, for example, polymers or copolymers of monoolefins like ethylene, propylene, butylene, etc.; also, copolymers of monoolefins and diolefins such as butadiene, isoprene, etc. These polymers are prepared usually by contacting the olefin to be polymerized with a catalyst in the presence of a solvent or diluent material at an elevated temperature and pressure. A number of catalytic materials can be used for the purpose of polymerizing olefins, the most desirable being chromium oxide, preferably containing hexavalent chromium, with silica, alumina, zirconia, thoria, silica-alumina, etc. These catalysts can be prepared, for example, by contacting soluble salts of chromium with silica, alumina, thoria, etc., for a sufficient period of time to impregnate the latter material. Following this, excess liquid is removed, for example, by filtering after which the solid catalysts are dried and activated at temperatures in the range of 450° F. to 1500° F. under non-reducing conditions (e.g. in anhydrous air) for several hours. For a detailed discussion of the catalysts, their composition and their methods of preparation, reference can be had to the copending application of Hogan and Banks, Serial No. 573,877, now U.S. 2,825,721, filed March 26, 1956, wherein the catalysts are discussed in detail. These and other solid catalysts or catalysts containing a solid component can be treated in the method of this invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure usually is maintained at a sufficient level to assure a liquid phase reaction, that is, at least about 100 to 300 p.s.i.g., depending upon the type of feed material and the polymerization temperature. Higher pressures up to 500 to 700 p.s.i.g. or higher can be used, if desired. The catalyst concentration in the reactor usually varies from between about 0.01 and about 10 percent by weight and generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, as previously stated, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually, the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic hydrocarbons having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents can also be used; however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions can also be employed in carrying out the reaction of olefins to form solid polymers.

Although the invention is applicable to polymerization systems in general, it finds particular use in processes for the polymerization of 1-olefins having a maximum of 8 carbon atoms per molecule and no branching nearer the double bond than the 4-position; and more particularly in processes for the polymerization of ethylene under conditions which provide polymers of ethylene which have a density of at least 0.94 and preferably 0.96 or higher and a crystallinity of at least 70 percent and preferably at least 80 percent at normal atmospheric temperatures. While the polymerization of ethylene provides a preferred embodiment of the invention, it is not intended that the scope of the invention be limited thereby but that any of the other processes described are also within the invention.

One method of preparing polymers of olefins is described in detail in a copending application of Hogan and Banks, Serial No. 573,877, filed March 26, 1956. This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, or aromatic compound which is inert and in which the formed polymer is soluble. The reaction is ordinarily carried out at a temperature between about 150° F. and about 450° F. and under a pressure sufficient to maintain the reactant and diluent substantially in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatuers and a fixed catalyst bed, the polymer has predominantly trans-internal unsaturation. Polymers prepared by both methods are also characterized by their high densities and high percentage of crystallinity at normal atmospheric.

When preparing olefin polymers using the methods and catalysts previously described, a portion of the olefin feed is often converted to heavy polymers of substantially higher molecular weight than the desired polymer product. These heavy polymers which are almost insoluble in the diluents (and at the temperatures) employed in the polymerization reaction frequently become associated with the catalysts solids. It is not unusual for the catalyst to pass through the entire catalyst recovery system and emerge contaminated with substantial quantities of the heavy polymers. For example in the polymerization of ethylene using the method and catalysts of Hogan and Banks (Serial No. 573,877) the recovered catalyst can contain from about 25 percent to about 80 percent of polymer by weight. Similar high concentrations of heavy, substantially insoluble polymer, associated with the polymerization catalyst, are encountered in systems employing other feed materials, catalysts and different reaction conditions.

In carrying out the process of this invention in one of its embodiments a polymer solution, for example, a solution of solid ethylene polymer, containing finely sub-divided solids, such as chromium oxide catalyst, containing hexavalent chromium, associated with silica-alumina, said catalyst having associated therewith between about 25 percent and about 80 percent by weight of heavy, substantially insoluble polymers, is reduced in temperature to the level at which polymer begins to precipitate from solution. Preferably this operation is carried out under conditions of mild agitation. The initial precipitation temperature will vary depending on the particular polymer being treated, and the solvent in which the polymer is dissolved. For example when treating an ethylene polymer dissolved in cyclohexane precipitation usually begins in a temperature range of between about 230° and about 200° F. When treating other polymers in the various solvents which are employed in carrying out the polymerization reaction the initial precipitation temperature can vary over a relatively wider range, such as from about 300° to about 200° F.

When the initial polymer precipitation temperature is reached a portion of dissolved polymer is released from solution and the particles of catalyst adhere together and agglomerate. To provide the best separation it is desirable that the temperature reduction continue beyond the point of initial precipitation whereby a larger amount of polymer is precipitated and additional agglomeration of the catalyst is provided. Usually the cooling process is continued until the catalyst agglomerate contains between about 75 percent and about 95 percent of polymer by weight. When treating ethylene polymer in cyclohexane this occurs when the temperature reaches between about 210° and about 190° F. When processing other polymers, dissolved in the various solvents previously discussed, the temperature range of maximum agglomeration is between 250° F. and 200° F., depending on the particular polymer and solvent being treated.

At this point the cooling process is terminated and the agglomerated solids and remaining polymer solution are heated, whereby the temperature is increased and a portion of the precipitated polymer is re-dissolved. It has been found that the heating operation can be continued until the temperature of the solution reaches a level greater than the temperature at which initial polymer precipitation occurred during the cooling operation, without dispersing the agglomerated solids. Thus, when recovering catalyst from a solution of ethylene polymer in cyclohexane re-heating can be continued until the solution reaches a temperature of between about 2° F. and about 20° F. above the initial precipitation temperature thus, providing a final heated solution having a temperature of between about 250° F. and about 202° F. In general, the temperature differential noted will apply in the treatment of other polymers dissolved in other solvents.

Following the re-heating process, during which the concentration of polymer in the catalyst agglomerates is reduced to between about 50 and about 90 percent by weight, the agglomerates are removed from the polymer solution by a suitable separation procedure such as for example, by filtering, centrifugation, etc.

Although the mechanism of solids agglomeration, within the scope of this invention, is not clearly understood it is believed that an important factor is the heavy polymer associated with the catalyst solids. It is believed that the changes in temperature which bring about agglomeration effect changes in the polymer properties whereby the particles of solids become adherent to each other and thus form agglomerates.

It is known that precipitation of soluble polymer from solution aids in the agglomeration, however, agglomeration does occur without appreciable polymer precipitation; therefore, this does not appear to be an essential feature of the agglomeration process.

In accordance with another embodiment of the invention, a further treatment of the agglomerated solids is provided whereby a substantial portion of the polymer associated with the agglomerates is removed. In carrying out this embodiment the agglomerated solids are mixed with solvent in an amount usually between about 5 and about 20 lbs./lb. of agglomerated solids and the mixture is heated whereby the temperature is raised to a sufficient level to assure dissolution of at least a portion of the polymer associated with the solid agglomerates. When dissolving ethylene polymer in cyclohexane the temperature is usually increased to between about 250° and about 350° F. Following this step the polymer solution and solids are passed through a separation step wherein separation between the solids and solution is effected. Usually it is preferred to combine the separated solution with the polymer solution originally separated from the agglomerated catalyst, whereby a single polymer solution yield stream is obtained.

In order to more clearly describe the invention and provide a better understanding thereof reference is had to the accompanying drawing, which is a diagrammatic illustration of a polymerization reactor, an ethylene removal vessel, a cooling vessel, a heat exchanger and a solids separation apparatus suitable for the performance of this invention. Referring to the drawing, ethylene, cyclohexane diluent and chromium oxide catalyst are introduced to reactor 8 through conduits 2, 4 and 6, respectively. For ease of handling, the catalyst is slurried in cyclohexane before it is introduced to the reactor. During polymerization the material in the reactor is maintained in a highly agitated state by means of a mechanical mixer or other conventional mixing means (not shown). The reaction is carried out at a temperature of about 285° F. and a pressure of about 500 p.s.i.a. and for a sufficient period of time to convert a portion of the ethylene feed to solid ethylene polymer (at ambient temperatures). Reaction effluent leaves the reactor through conduit 10 and enters a separation zone 12 wherein a stream comprising principally unconverted ethylene and some solvent is separated and returned to the reactor through conduit 14 and cooler 16. Following this step, the effluent is combined with additional solvent introduced through conduit 18. The mixture, comprising a solution of solid ethylene polymer in cyclohexane containing a finely sub-divided catalyst is then introduced to precipitator vessel 24. This vessel comprises a confined cylinder having disposed therein a cylindrical section 28 of lesser diameter openly communicating with the confined cylinder in the upper portion thereof. Feed solution from conduit 20 is introduced to the inner section 28 wherein cooling precipitation of polymer and agglomeration of the catalyst takes place. The cooling is provided by reducing the pressure on the precipitator whereby cyclohexane is vaporized from the polymer solution and the solution temperature is decreased. The vapors released by the reduction in pressure pass overhead from the precipitator through conduit 32 and are condensed in condenser 34. In order to minimize foaming in the precipitator and also to maintain a substantially constant concentration of cyclohexane solvent the condensed cyclohexane is returned to the precipitator through conduit 36 and sprays 30. As desired however, a portion of the solvent can be passed from the system through conduit 35. As the feed solution passes upwardly through section 28 the temperature decreases, polymer precipitates from solution and the catalyst particles are agglomerated. The material leaving this section comprises polymer solution and catalyst agglomerated with about 95 percent polymer by weight at a temperature of about 200° F. Although the continuous introduction of feed solution is in itself sufficient to provide passage of the agglomerated solids from section 28 removal of the solids is also aided by vaporization of cyclohexane in the feed solution which has a buoyant effect whereby solids are floated to the top of this section. A mixture of polymer solution and agglomerated solids overflows into section 6 and is withdrawn from the bottom of vessel 24 through conduits 38, in the form of a slurry. This material is passed via pump 40 through heat exchanger 42 where the slurry temperature is increased to a level above above the temperature at which precipitation was initially effected from the feed. As a result of the heating step the concentration of polymer in the catalyst agglomerates is reduced from about 95 percent by weight to about 85 percent. The material leaving heater 42 enters solids separation zone 44, for example a filter, centrifuge or the like, wherein the polymer solution and agglomerated solids are separated. The polymer solution is yielded through conduit 58 and the agglomerated solids are recovered through conduit 46.

In this particular embodiment of the invention a further processing operation is provided whereby the catalyst further reduced in polymer content is recovered. To accomplish this a small amount of solvent is introduced to the agglomerated solids through conduit 48, the mixture being passed through heater 50 whereby a portion of the polymer remaining associated with the agglomerated solids is dissolved in the polymer solution. The solids are then passed to a secondary solids separation zone 52 from which polymer solution is recovered through conduit 56, being combined with the polymer solution in conduit 58, and catalyst solids are yielded through conduit 54.

The preceding embodiment of the invention has been described in conjunction with a specific apparatus arrangement, however, this is not intended in any way to limit the scope of the invention. For example, it is within the scope of the invention to transfer the heat exchanger 42 to section 26 of vessel 24, such as by installing a heating coil in the lower portion of section 26 or by use of a double walled precipitator vessel with a heating fluid between the inner and outer walls. It is also within the scope of the invention to provide cooling of the polymer solution and agglomeration of the chromium catalyst other than by auto-refrigeration, as shown in the drawing.

The following data is presented to illustrate the invention in one embodiment thereof:

EXAMPLE I

A solid polymer of ethylene was prepared in the presence of a catalyst comprising 2.5 percent by weight of chromium as chromium oxide, containing 2.2 percent hexavalent chromium, with silica-alumina (weight ratio 9:1), prepared by impregnating silica-alumina with an aqueous solution of chromium trioxide, followed by drying and activation in dry air at gradually increasing temperatures up to 950° F.

A sample of the catalyst-containing ethylene polymer solution was diluted with cyclohexane and heated at 300° F. to provide a 4 weight percent polymer solution. The solution was cooled to 225° F. in a Jerguson gauge glass and agitation was commenced. The temperature of the solution was further decreased and at approximately 210° F. the catalyst particles started to grow. Between 205 and 200° F. the catalyst agglomerates became quite large and the solution, which before had been cloudy, began to clear. The reduction in temperature was continued down to 190° F. before the solution became substantially clear (indicating complete catalyst agglomeration). Cooling was continued down to 180° F. at which point the procedure was reversed and heating of the solution was commenced. The solution appeared even clearer and more fluid at 205° F. than it did during the cooling cycle. At this point it was possible to withdraw catalyst agglomerates containing a minimum amount of occluded polymer, less than the amount associated with the catalyst during the cooling cycle.

The catalyst agglomerates did not start to break up until the temperature reached about 216° F. even with mild agitation. By the time the temperature reached 221° F. most of the catalyst particles had returned to their original size (similar in appearance to their conditions preceding the cooling cycle). Both the cooling and heating cycles were carried out at time temperature rates of about one degree Fahrenheit per minute.

EXAMPLE II

A test similar to that described in Example I was carried out with a second sample of polymer solution, also having a polymer concentration of about 4%. The conditions obtaining during this test were as follows:

*Cooling cycle (at a rate of about 1° F./minute).*

[Heated solution to 250° F. to put all of the polymer in solution]

210° F.—Some good size particles formed.
205° F.—Catalyst mostly agglomerated, solution quite clear.
201° F.—Solution quite clear, about 18 good size agglomerates.

*Heating cycle (at a rate of about 1° F./minute)*

205° F.—Still about the same.
210° F.—Still about the same.
215° F.—Agglomerates breaking up some.

At this point it was possible to withdraw catalyst agglomerates containing a minimum amount of occluded polymer, less than the amount associated with the catalyst during the cooling cycle.

219° F.—Agglomerates breaking up quite rapidly.
223° F.—Agglomerates fairly well dispersed, solution cloudy.

The preceding examples clearly illustrate that catalyst agglomeration can be effected by cooling a polymer solution containing sub-divided catalyst, and that heating with accompanying dissolution of at least a portion of the polymer associated with the catalyst particles can be effected without dispersing the agglomerates.

Having thus described the invention by providing a specific example thereof it should be understood that no undue limitations or restrictions are to be drawn by reasons thereof and that many modifications and variations are within the scope of the invention.

I claim:

1. A process for recovering solids consisting essentially of supported chromium oxide catalyst from a solution of a normally solid polymer of a 1-olefin having a maximum of 8 carbon atoms per molecule and no branching nearer the double bond than the 4-position which comprises reducing the temperature of the polymer solution to the level where polymer begins to precipitate, continuing the reduction in temperature until additional polymer precipitates and the solids agglomerate, increasing the temperature of the polymer solution to a level above the temperature at which the polymer initially precipitated whereby a portion of the precipitated polymer is redissolved and separating the agglomerated catalyst solids from the polymer solution before redispersal of said solids.

2. The process of claim 1 in which the solids consist essentially of chromium oxide catalyst containing hexavalent chromium associated with silica-alumina and the polymer is a solid polymer of ethylene.

3. A process for recovering solids consisting essentially of supported chromium oxide catalyst from a solution of normally solid polymer of a 1-olefin having a maximum of 8 carbon atoms per molecule and no branching nearer the double bond than the 4-position, said polymer having an initial precipitation temperature between 330° F. and 200° F., which comprises reducing the temperature of the polymers solution to between about 250 and about 190° F. whereby polymer precipitates from solution and the solids agglomerate, increasing the temperature of the polymer solution to between about 320° F. and 202° F. whereby a portion of the precipitated polymer is redissolved and separating the agglomerated solids from the polymer solution.

4. The process of claim 3 in which the solids consist essentially of chromium oxide containing hexavalent chromium associated with silica-alumina and the olefin polymer is a solid polymer of ethylene.

5. A process for recovering solids consisting essentially of supported chromium oxide catalyst from a solution of normally solid ethylene polymer which comprises reducing the temperature of the polymer solution to between about 230° F. and about 200° F. whereby polymer begins to precipitate from solution, continuing the temperature reduction of the solution until additional polymer precipitates and the solids agglomerate, increasing the temperature of the polymer solution to between about 250° F. and 202° F. whereby a portion of precipitated polymer is redissolved and separating the agglomerated solids from the polymer solution.

6. The process of claim 5 in which the solids consist essentially of chromium oxide containing hexavalent chromium associated with silica-alumina.

References Cited in the file of this patent

UNITED STATES PATENTS

| | | |
|---|---|---|
| 2,691,647 | Field et al. | Oct. 12, 1954 |
| 2,702,288 | Hoeksema et al. | Feb. 15, 1955 |
| 2,840,551 | Field et al. | June 24, 1958 |

UNITED STATES PATENT OFFICE
CERTIFICATE OF CORRECTION

Patent No. 2,930,787                      March 29, 1960

William L. Stalder

It is hereby certified that error appears in the printed specification of the above numbered patent requiring correction and that the said Letters Patent should read as corrected below.

Column 8, line 12, for "330°" read -- 300° --.

Signed and sealed this 31st day of January 1961.

(SEAL)
Attest:
KARL H. AXLINE
Attesting Officer

ROBERT C. WATSON
Commissioner of Patents